(12) United States Patent
Mangum et al.

(10) Patent No.: US 9,751,552 B2
(45) Date of Patent: Sep. 5, 2017

(54) SNOW VEHICLE

(71) Applicant: Polaris Industries Inc., Medina, MN (US)

(72) Inventors: Allen M. Mangum, Sandpoint, ID (US); Justin R. York, Sagle, ID (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/935,265

(22) Filed: Nov. 6, 2015

(65) Prior Publication Data
US 2017/0129526 A1 May 11, 2017

(51) Int. Cl.
*B62B 13/04* (2006.01)
*B62B 17/04* (2006.01)

(52) U.S. Cl.
CPC ............ *B62B 13/046* (2013.01); *B62B 17/04* (2013.01)

(58) Field of Classification Search
CPC ..... B62B 17/04; B62B 13/046; B62B 13/043; B62M 2027/021
See application file for complete search history.

(56) References Cited

U.S. PATENT DOCUMENTS

| | | | | |
|---|---|---|---|---|
| 3,705,749 A * | 12/1972 | Harvey | ................... | B62B 17/04 180/193 |
| 3,809,172 A * | 5/1974 | Hendrickson | .......... | B62M 27/00 180/190 |
| RE28,423 E * | 5/1975 | Higginbotham | ........ | B62B 17/04 280/21.1 |
| 3,977,485 A * | 8/1976 | West | ....................... | B62B 17/04 180/186 |
| 3,982,597 A * | 9/1976 | Callaway | ................ | B62B 13/08 244/108 |
| 4,034,820 A * | 7/1977 | Barnhardt | ............... | B62B 17/04 267/32 |
| 4,131,292 A | 12/1978 | Swech | | |
| 4,424,979 A * | 1/1984 | Takagi | .................... | B62B 17/04 280/21.1 |
| 4,509,766 A * | 4/1985 | Yasui | ...................... | B62B 17/04 280/21.1 |

(Continued)

FOREIGN PATENT DOCUMENTS

| | | |
|---|---|---|
| DE | 202006017459 | 6/2007 |
| EP | 0391282 | 10/1990 |

(Continued)

OTHER PUBLICATIONS

Technical Preview, SnowTech, *Crazy Mountain Xtreme Bike Kit*, Sep. 2015; 3 pages.

(Continued)

*Primary Examiner* — Kevin Hurley
(74) *Attorney, Agent, or Firm* — Faegre Baker Daniels LLP

(57) ABSTRACT

A snow vehicle is disclosed comprising a vehicle frame, a propulsion unit coupled to the frame, and a front ski steered by a steering mechanism. The front of the vehicle includes a first front suspension and a second front suspension coupled to the ski. The rear suspension includes a bumper assembly preventing bottoming out of the rear suspension. The rear suspension is coupled to the vehicle frame such that the longitudinal spacing between the vehicle frame and rear suspension is adjustably controllable.

22 Claims, 9 Drawing Sheets

(56) References Cited

U.S. PATENT DOCUMENTS

| | | | | |
|---|---|---|---|---|
| 4,613,006 | A | * | 9/1986 | Moss ............... B62K 13/00 180/184 |
| 4,804,198 | A | * | 2/1989 | Imai ............... B62B 17/04 280/124.127 |
| 5,203,424 | A | | 4/1993 | Gogo |
| 5,474,146 | A | * | 12/1995 | Yoshioka ........... B62K 13/00 180/184 |
| 5,727,643 | A | * | 3/1998 | Kawano ............ B62D 55/108 180/193 |
| 6,095,275 | A | | 8/2000 | Shaw |
| 6,431,301 | B1 | * | 8/2002 | Forbes ............. B62K 3/002 180/185 |
| 7,182,165 | B1 | * | 2/2007 | Keinath ............ B62M 27/02 180/185 |
| 8,910,738 | B2 | | 12/2014 | Mangum |
| 2003/0159868 | A1 | | 8/2003 | Alexander |
| 2004/0089193 | A1 | | 5/2004 | O'Donnell |
| 2008/0029324 | A1 | * | 2/2008 | Plankenhorn ........ B62B 13/08 180/190 |
| 2009/0321167 | A1 | | 12/2009 | Simmons |
| 2015/0144412 | A1 | | 5/2015 | Mangum |
| 2015/0251727 | A1 | | 9/2015 | Thibault |
| 2015/0259032 | A1 | | 9/2015 | Mangum |
| 2016/0031471 | A1 | | 2/2016 | Anderson et al. |
| 2016/0167722 | A1 | | 6/2016 | Anderson et al. |

FOREIGN PATENT DOCUMENTS

| | | |
|---|---|---|
| JP | S61222877 | 10/1986 |
| JP | 2001153168 | 6/2001 |

OTHER PUBLICATIONS

International Search Report and Written Opinion of the International Searching Authority, dated Apr. 18, 2017, for related International Patent Application No. PCT/US2016/060441; 27 pages.

* cited by examiner

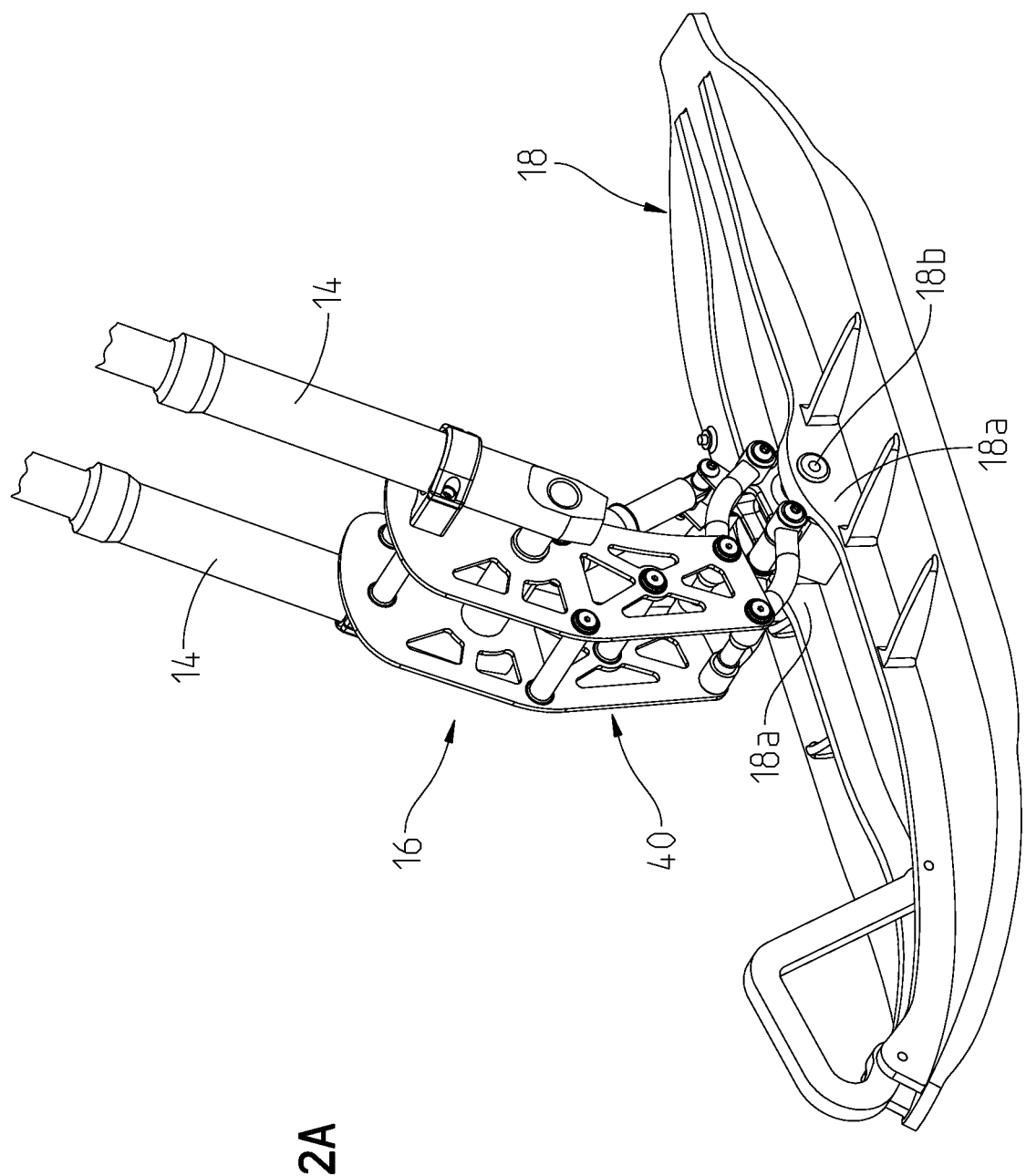

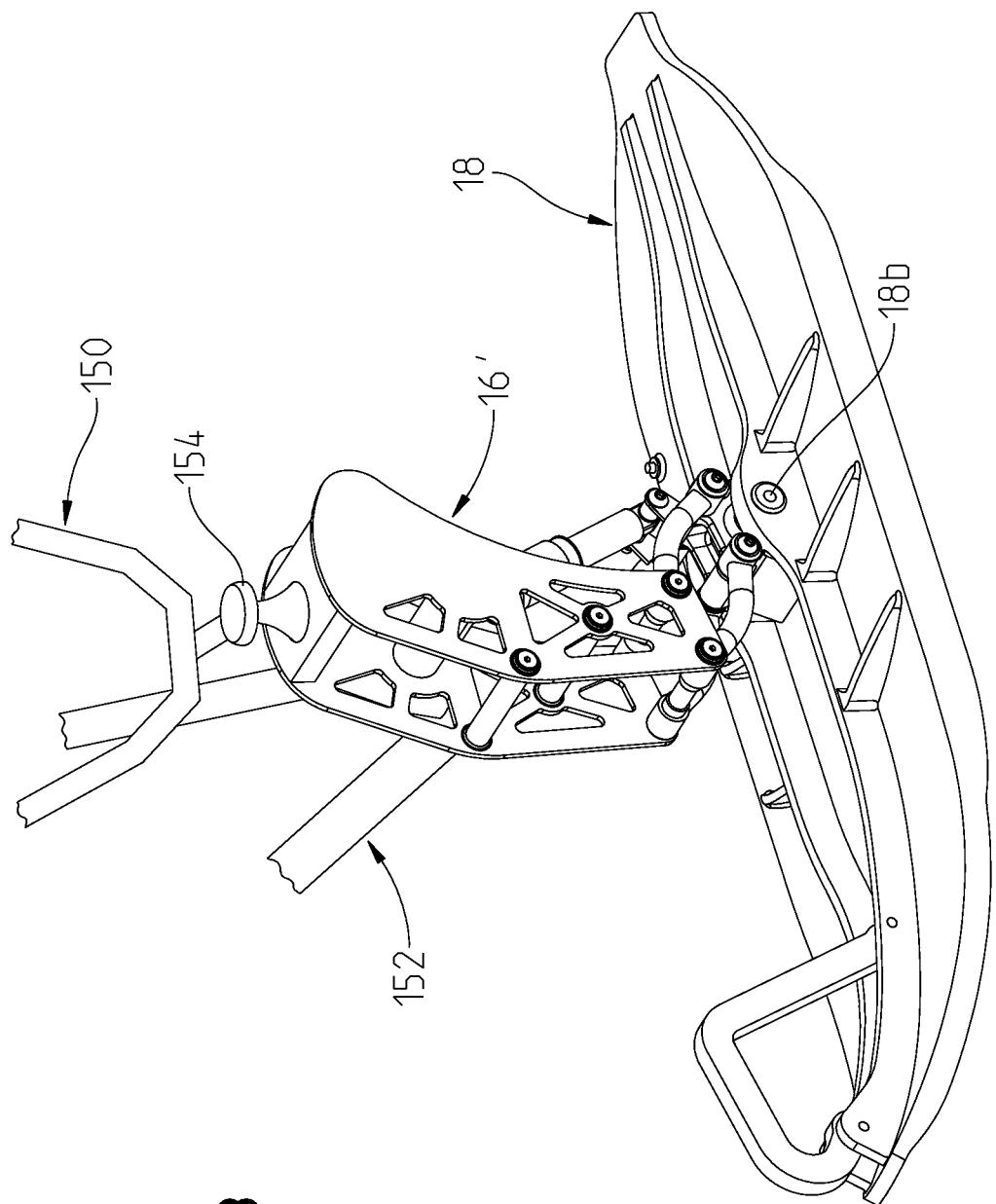

SNOW VEHICLE

BACKGROUND

The present disclosure relates to snow vehicles including snowmobiles and or snow bikes and in particular a front suspension for the same.

Many types of vehicles are configured with tracks to drive in the snow. Regardless of whether the vehicle is a snowmobile or a wheeled vehicle converted to a tracked vehicle, tracked vehicles typically include a front suspension system that supports the ski and is coupled to the frame. In the case of snow bikes, the front suspension comprises the suspension of the motorbike or dirt bike, that is, a front shock absorber. In the case of snowmobiles, the front suspension is typically includes two control arms, also known as double A-arms. However the front snowmobile suspension can also be a trailing arm suspension. The suspension described herein would typically supplement any of the front suspensions discussed above, although it could also be the primary suspension.

One such snow vehicle is shown in our U.S. Pat. No. 8,910,738, the subject matter of which is incorporated herein by reference. This patent discloses a conversion of a motorbike into a snow vehicle where the motorbike powertrain is utilized to power the track of the converted snow vehicle.

SUMMARY

In a first embodiment, a snow vehicle comprises a frame; a propulsion unit coupled to the frame; at least one front ski; a steering mechanism coupled to the frame; a first front suspension coupled to the frame; a second front suspension positioned intermediate the first front suspension and the at least one ski; a rear suspension coupled to the frame, the rear suspension comprising: at least one slide rail; at least one control arm coupled between the slide rail and the frame; at least linear force element coupled between the slide rail and the frame; and at least one carrier roller coupled to the at least one slide rail; and a drive system comprising a drive track slidably guided by the at least one slide rail and drivably coupled to the propulsion unit.

In a second embodiment, a front suspension for a snow vehicle comprises a spindle body; a knuckle for coupling to a ski of the snow vehicle; and at least one control arm coupled intermediate the spindle body and to the knuckle.

BRIEF DESCRIPTION OF THE DRAWINGS

The invention will now be described in relation to the drawing Figures where:

FIG. 2A shows a left front perspective view of the front suspension coupled to the snow vehicle;

FIG. 2B is a front suspension similar to that of FIG. 2A showing the front suspension coupled to a conventional snowmobile;

DETAILED DESCRIPTION OF THE EMBODIMENTS

Figure 1:
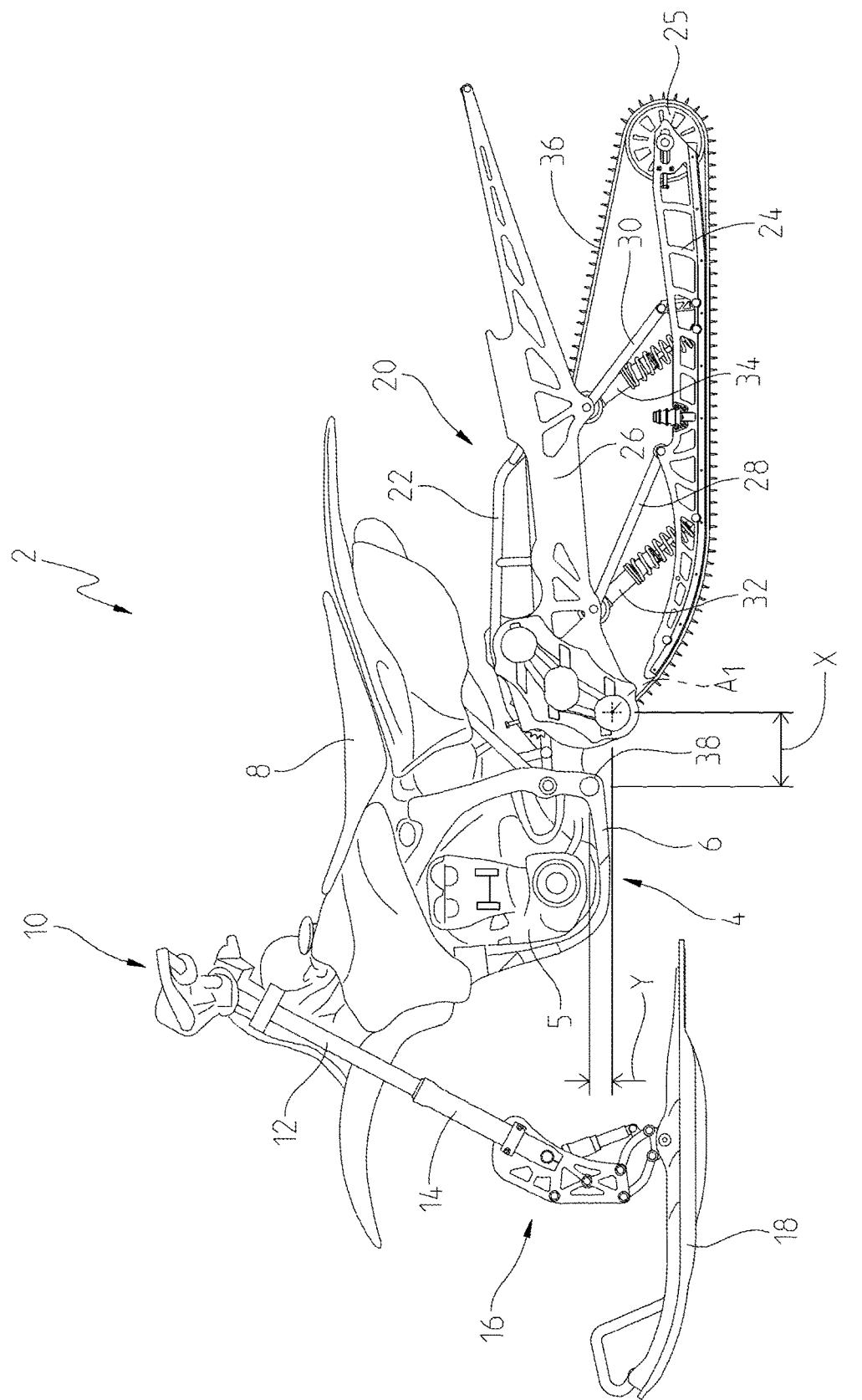
FIG. 1 is a side view of one of the embodiments of snow vehicle as disclosed in the present disclosure.

With reference first to FIG. 1, a snow vehicle is shown generally at 2 as comprised of a motorcycle portion 4 having a propulsion unit 5, which is shown as a two-cylinder motorcycle engine, a frame 6, an operators seat 8, and a steering assembly 10 which includes a front fork 12. A first suspension member is shown at 14 as a shock absorber assembly axially coupled with the forks 12. A second front suspension assembly is shown at 16 which couples the steering assembly 10 directly to a ski 18. A full description of the entire snow vehicle is described in our co-pending patent application Ser. No. 14/935,224, filed Nov. 6, 2015 and incorporated herein by reference.

A rear suspension assembly 20 is shown having an upper frame portion 22, slide rails 24, carrier rollers 25, side panels 26, control arms 28, 30, linear force elements 32 and 34 (shown as shock absorbers) and an endless belt or drive track 36. As shown, the control arms 28, 30 and the linear force elements 32 and 34 are coupled between the slide rail 24 and the frame 22. A carrier roller 25 is coupled to the slide rail 24. A drive system 36 comprising a drive track 40 is slidably guided by the slide rail 24 and is drivably coupled to the propulsion unit 5.

With reference now to FIGS. 2A and 3-5, the front suspension assembly 16 will be described in greater detail. As shown best in FIGS. 3 and 4, front suspension assembly 16 generally includes a spindle body 40, a lower linkage portion 42, and a mounting portion 44. As shown best in FIG. 5, spindle portion 40 is generally comprised of two plates 50 and 52 where each plate includes a plurality of apertures. Namely, plate 50 includes apertures 50a-50g together with an enlarged aperture at 50h. Likewise, plate 52 includes apertures 52a-52g and an enlarged aperture at 52h. Spindle portion 40 also includes a plurality of spacers to space the plates 50 and 52 apart, namely spacers 54a, 54b, 54c, and 54g. An enlarged spacer is provided at 54h. It should be noted each of the spacers 54a, 54b, 54c, and 54g are somewhat spool-shaped having an enlarged head portion 56 at each end as well as threaded openings 58 at each end. Enlarged spacer 54h is embossed at each end to define a reduced diameter section 60 defining shoulders 62.

Figure 3:
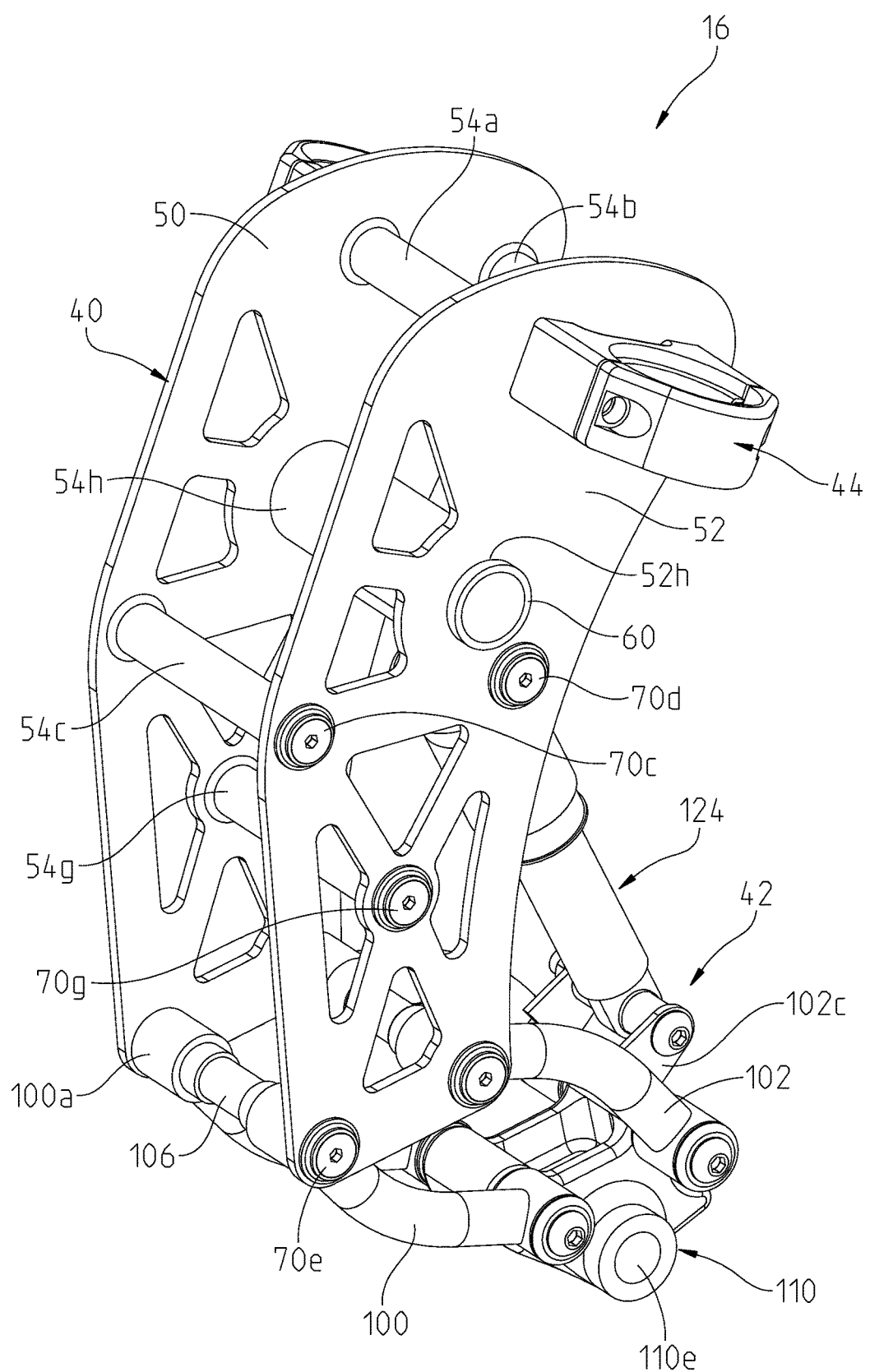
FIG. 3 is a front left perspective view of the suspension assembly.
Figure 4:
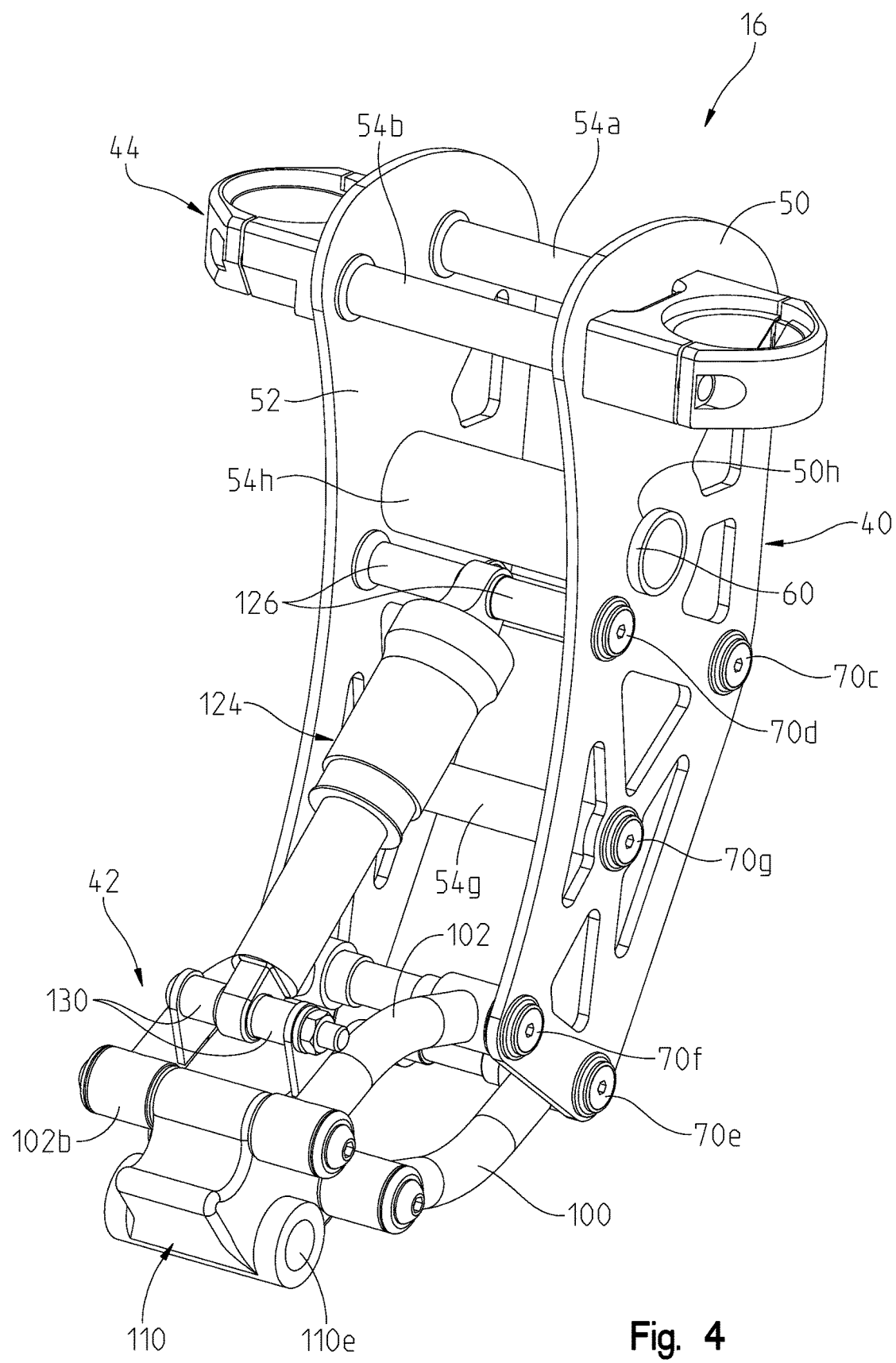
FIG. 4 is a rear right perspective view of the suspension assembly of FIG. 3.

Thus, the spindle portion may be preassembled by placing the reduced diameter portion 60 of spacer 54h into respective apertures 50h and 52h. This positions the reduced diameter portion 60 through the corresponding apertures 50h and 52h as shown in FIGS. 3 and 4. Spacers 54c and 54g may then be aligned with corresponding apertures 50c, 52c; and 50g, 52g. Fasteners and washers may then be positioned against plates 50 and 52 to retain the two plates together and coupled to the spacers. Namely, fastener 70c and washer 72c may be aligned with aperture 52c and brought into threaded engagement with threaded aperture 58 of spacer 54c. Likewise, fasteners 70g and washers 72g may be received through apertures 50g and 52g to be received into the threaded ends 58 of spacer 54g. The fasteners should be brought into engagement with the threaded apertures of their corresponding spacers but not fully torqued down at this position as other spacers and assembly is required within the spindle assembly.

Figure 5:
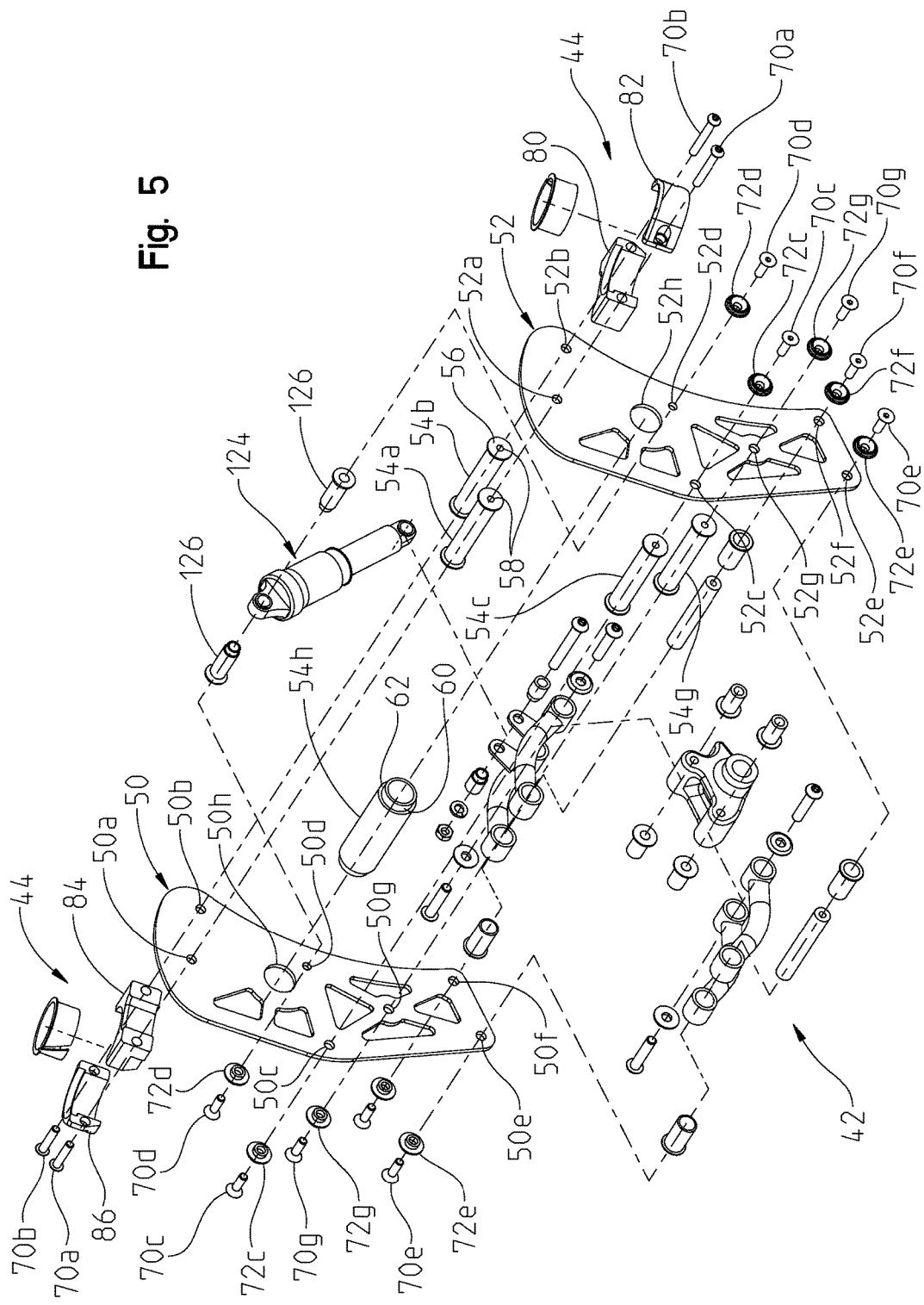
FIG. 5 is a view similar to that of FIG. 3 showing the suspension in an exploded manner.

With reference still to FIG. 5, mounting portion 44 is shown including clamp halves 80, 82; 84, 86. Each of the pairs of clamp halves includes semi-cylindrical openings which may encompass the front forks of the motorcycle frame as described above with reference to FIG. 1. Thus, spacers 54a and 54b are now aligned with respective pairs of apertures 50a, 50b; 52a and 52b; and fasteners 70a and 70b are received through their respective apertures as shown in FIG. 5. This brings fasteners into engagement with the threaded ends 58 of the corresponding spacers 54a and 54b to a position where the clamp may be closed.

Figure 5A:
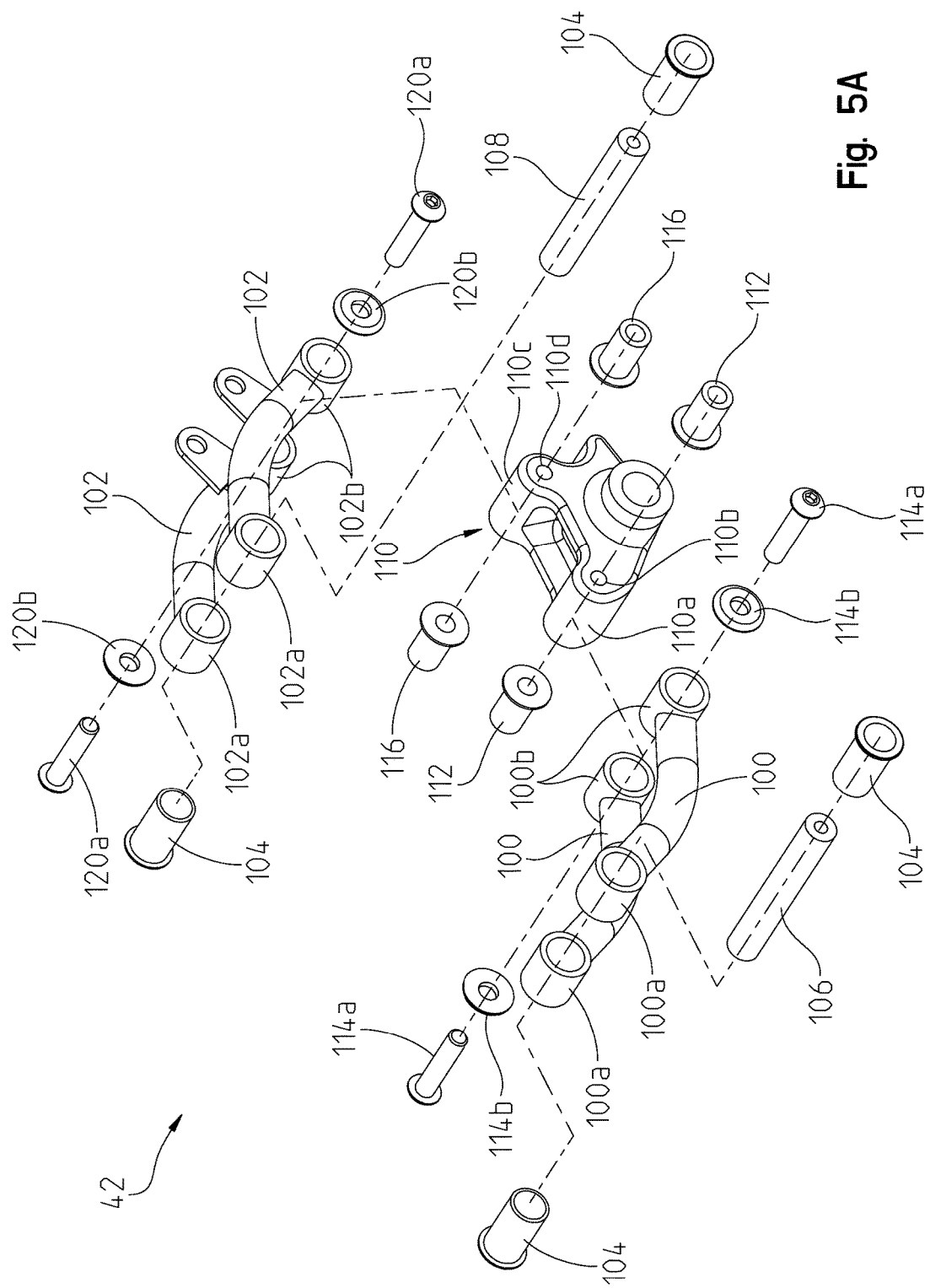
FIG. 5A is an enlarged portion of the linkage assembly shown in FIG. 5.

With reference now to FIG. 5A, the link assembly 42 is shown and will be described in greater detail. As shown best in FIG. 5A, link assembly 42 includes front links or control arms 100 and rear links or control arms 102. Each control arm 100 includes an upper coupling 100a and a lower coupling at 100b. Likewise, control arms 102 include upper couplings at 102a and lower couplings at 102b. Each of the upper couplings 100a and 102a receive sleeves 104 which are profiled to be received in the couplings 100a, 102a. Spacers 106 and 108 respectively, are then inserted through corresponding couplings 100a, 102a and into sleeves 104. Likewise, spacer 108 is received into couplings 102a, and into sleeves 104. Thus, control arms 100 and 102 may be aligned with respective apertures 50e, 52e, and 50f, 52f (FIG. 5) and fastened to the spindle assembly by way of fasteners and washers 70e, 72e and 70f, 72f.

With reference again to FIG. 5A, linkage assembly 42 further includes a knuckle 110 having a front pivot coupling 110a having an aperture at 110b and a rear pivot coupling 110c having an aperture 110d. Sleeves 112 may be received in lower couplings 100b of control arms 100 (in the orientation shown in FIG. 5A) and then couplings 100b may be received in alignment with apertures 110b whereupon fasteners 114a and washers 114b may be aligned with threaded apertures 110b to couple control arms 100 with the knuckle 110. In a like manner, sleeves 116 may be received in lower couplings 102b (in the orientation shown in FIG. 5A) whereby couplings 102b and sleeves 116 are received over rear pivot coupling 110c and in alignment with threaded apertures 110d. Thereafter, fasteners 120a and washers 120b may be aligned with sleeves 116 to couple alignment arms 102 with knuckle 110.

Figure 5B:
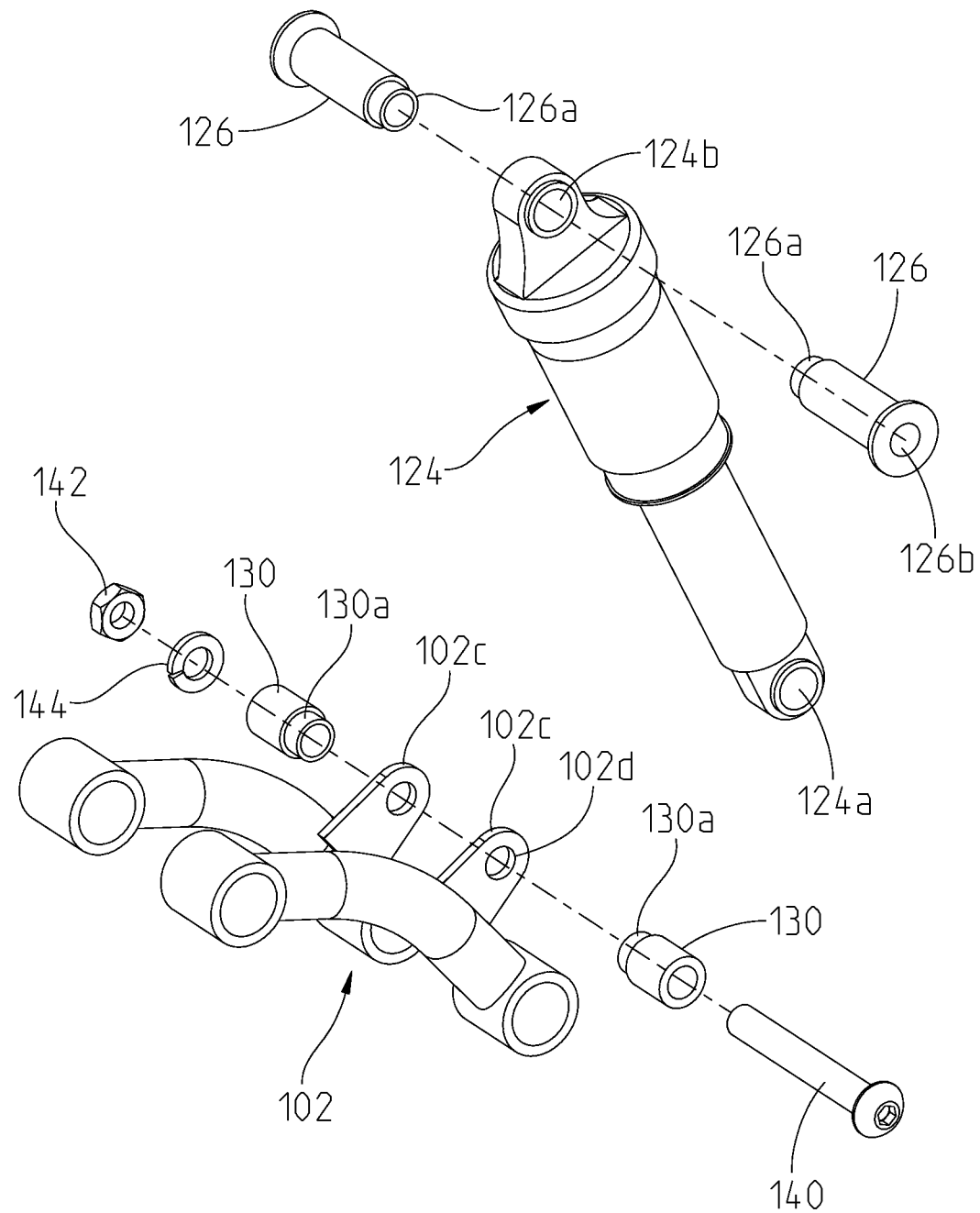
FIG. 5B is an enlarged portion of the shock absorber mounting as shown in FIG. 5.

Finally, with reference to FIG. 5B, linkage 42 further includes a shock absorber 124 having a lower coupling at aperture 124a and an upper coupling at aperture 124b. Split sleeves 126 include reduced diameter portions 126a and threaded apertures at 126b. Split sleeves 126 may be positioned with reduced diameter portions 126a in apertures 124b and the shock may be coupled to the spindle assembly by way of fasteners 70d and washers 70e positioned through apertures 50d (FIG. 5) and into threaded engagement with threaded apertures 126b. The lower aperture 124a of shock 124 may then be coupled to bracket arms 102c as shown in FIG. 5B. Sleeves 130 are positioned with reduced diameter portions 130a within the shock aperture 124a. The sleeves 130 and the shock aperture 124a are then aligned with apertures 102d whereupon fastener 140 may be received through sleeves 130, apertures 102d and receive a fastener 142 and lock washer 144. Thus, the entire assembled second suspension system 16 is shown in FIGS. 3 and 4 where knuckle 110 is shown as providing an aperture 110e for coupling to ski 18 as shown above in FIG. 2A. That is, ski 18 includes ski rails 18a whereby a pin 18b may be received through the rails and into aperture 110e for retaining ski 18 to the second suspension system 16. Ski 18 could be similar to that shown in U.S. Pat. No. 8,381,857, the subject matter of which is incorporated herein by reference.

Figure 6A:
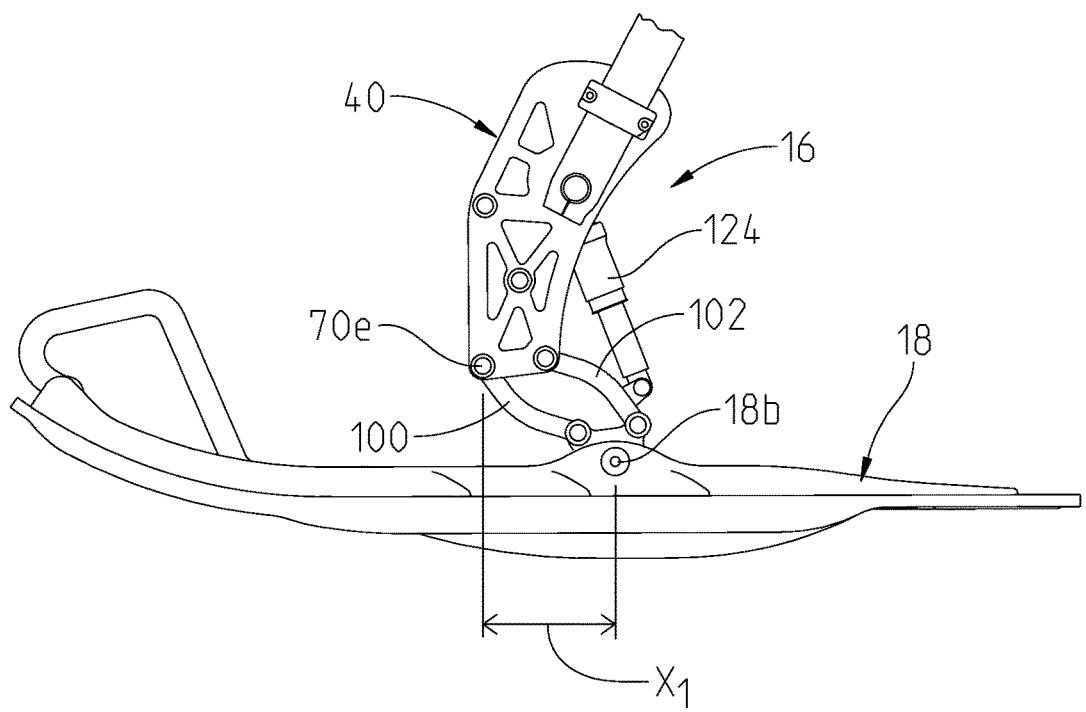
FIG. 6A shows a side view of the front suspension coupled to a ski in the fully extended position.
Figure 6B:
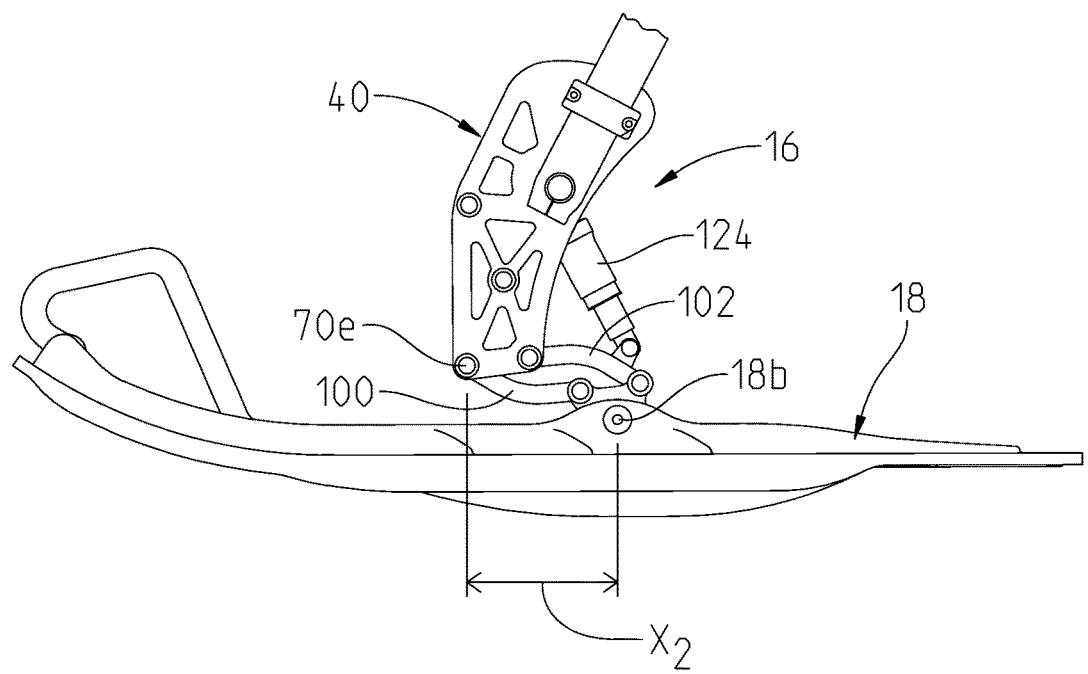
FIG. 6B shows the front suspension of FIG. 6a in a full trounce position.

Thus, in operation and with reference to FIGS. 6A and 6B, ski 18 is shown in a fully extended position in FIG. 6A and in a full trounce position in FIG. 6B. As shown in FIG. 6B, control arms 100 and 102 are shown collapsed with the shock absorber 124 in a stroked position. Advantageously, the ski is lifted up and rearwardly relative to spindle assembly 40. It is lifted upwardly in the sense that it rotated (in the clockwise sense as viewed in FIG. 6B). It is rotated in the range of 1-5°. It also moves rearwardly, for example, the position of the pin 18b which couples the ski to knuckle 110 moves rearwardly from the positions shown in FIG. 6A to the position shown in FIG. 6B. That is, the distance in FIG. 6A between the upper pivot point of front control arm 100 (about fastener 70e) is shown as $X_1$, whereas in FIG. 6b the distance is shown as $X_2$, where $X_2$ is greater than $X_1$. This provides an enhanced suspension system in that the ski is lifted up and rearward; for example, if the snowbike is going over a rock or log, the ski is lifted up and over the log rather than pushing the ski into the log. This movement also reduces the friction between the ski and the snow due to the lifting of the ski.

It should be understood that the spindle assembly may also be usable on a conventional snowmobile, and as shown in FIG. 2B, spindle 16' is shown coupled to upper and lower alignment arms or control arms 150, 152, where upper control arm 150 is coupled to spindle assembly 16' by way of a ball joint at 154. Although not shown in FIG. 2B, lower control arm 152 would also be coupled by way of a ball joint to spindle assembly 16'. It should be further understood that spindle assembly 16 or 16' could be adapted for use with a trailing arm type snowmobile suspension of the type shown in U.S. Pat. No. 6,328,124, the subject matter of which is incorporated herein by reference.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A snow vehicle comprising:
   a frame;
   a propulsion unit coupled to the frame;
   at least one front ski;
   a steering mechanism coupled to the frame;
   a first front suspension coupled to the frame;
   a second front suspension positioned intermediate the first front suspension and the at least one ski;
   the ski being coupled to the second suspension at a ski coupling point
   the first front suspension allowing relative motion between the frame and the second front suspension, the second front suspension allowing relative motion between the first front suspension and the ski coupling point;
   a rear suspension coupled to the frame, the rear suspension comprising:
   at least one slide rail;
   at least one control arm coupled between the slide rail and the frame;

at least linear force element coupled between the slide rail and the frame; and at least one carrier roller coupled to the at least one slide rail; and a drive system comprising a drive track slidably guided by the at least one slide rail and drivably coupled to the propulsion unit.

2. The snow vehicle of claim 1, wherein the frame is comprised of a front frame portion and a rear frame portion.

3. The snow vehicle of claim 2, wherein the front frame portion is a motorcycle frame and the rear frame portion is coupled to the motorcycle frame and the rear suspension is coupled to the rear frame portion.

4. The snow vehicle of claim 3, wherein the first front suspension is a linear force element on a front fork of the motorcycle frame.

5. The snow vehicle of claim 4, wherein the second front suspension is coupled to an end of the front fork of the motorcycle frame.

6. The snow vehicle of claim 5, wherein the second front suspension comprises a spindle body and at least one control arm coupled to the ski.

7. The snow vehicle of claim 6, wherein the second front suspension further comprises a knuckle coupled to the ski, and the at least one control arm comprises two control arms coupled between the knuckle and the spindle, and a linear force element coupled between the knuckle and the spindle.

8. The snow vehicle of claim 7, wherein the two control arms extend from the spindle in a generally rearward direction, and wherein the two control arms upon collapse, move the ski rearwardly and upwardly.

9. The snow vehicle of claim 2, wherein the front frame portion is a bulkhead and the rear frame portion is a tunnel and the rear suspension is coupled to the tunnel.

10. The snow vehicle of claim 9, wherein the first front suspension comprises right upper and lower control arms, left upper and lower control arms and right and left linear force elements coupled between the bulkhead and one of the right and left upper and lower control arms.

11. The snow vehicle of claim 10, wherein the second front suspension comprises a spindle body and at least one control arm coupled to the ski.

12. The snow vehicle of claim 11, wherein the second front suspension further comprises a knuckle coupled to the ski, and the at least one control arm comprises two control arms coupled between the knuckle and the spindle, and a linear force element coupled between the knuckle and the spindle.

13. The snow vehicle of claim 12, wherein the two control arms extend from the spindle in a generally rearward direction, and wherein the two control arms upon collapse, move the ski rearwardly and upwardly.

14. The snow vehicle of claim 1, wherein the steering mechanism is coupled to the first suspension.

15. The snow vehicle of claim 14, wherein the first suspension is a linear force element.

16. The snow vehicle of claim 1, wherein the steering mechanism is coupled to the second suspension.

17. The snow vehicle of claim 16, wherein the second suspension comprises two control arms coupled to the frame and a linear force element coupled between the frame and at least one of the control arms.

18. The snow vehicle of claim 16, wherein the second suspension comprises a trailing arm suspension.

19. A snow vehicle comprising:

a frame comprising a front frame portion and a rear frame portion, wherein the front frame portion is a bulkhead and the rear frame portion is a tunnel and the rear suspension is coupled to the tunnel;

a propulsion unit coupled to the frame;

at least one front ski;

a steering mechanism coupled to the frame;

a first front suspension coupled to the frame, the first front suspension comprising right upper and lower control arms, left upper and lower control arms and right and left linear force elements coupled between the bulkhead and one of the right and left upper and lower control arms;

a second front suspension positioned intermediate the first front suspension and the at least one ski;

a rear suspension coupled to the frame, the rear suspension comprising:

at least one slide rail;

at least one control arm coupled between the slide rail and the frame;

at least linear force element coupled between the slide rail and the frame; and at least one carrier roller coupled to the at least one slide rail; and a drive system comprising a drive track slidably guided by the at least one slide rail and drivably coupled to the propulsion unit.

20. The snow vehicle of claim 19, wherein the second front suspension comprises a spindle body and at least one control arm coupled to the ski.

21. The snow vehicle of claim 20, wherein the second front suspension further comprises a knuckle coupled to the ski, and the at least one control arm comprises two control arms coupled between the knuckle and the spindle, and a linear force element coupled between the knuckle and the spindle.

22. The snow vehicle of claim 21, wherein the two control arms extend from the spindle in a generally rearward direction, and wherein the two control arms upon collapse, move the ski rearwardly and upwardly.

* * * * *